(12) United States Patent
Richmond et al.

(10) Patent No.: US 7,326,342 B2
(45) Date of Patent: Feb. 5, 2008

(54) FUEL FILTER CARTRIDGE AND KEYED END CAP

(75) Inventors: Thomas C. Richmond, Kearney, NE (US); Steven M. Todd, Kearney, NE (US); Kenneth W. Stirn, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 364 days.

(21) Appl. No.: 10/940,002

(22) Filed: Sep. 13, 2004

(65) Prior Publication Data
US 2006/0054547 A1     Mar. 16, 2006

(51) Int. Cl.
*B01D 35/153*     (2006.01)
(52) U.S. Cl. .................. 210/234; 210/235; 210/493.2; 210/450
(58) Field of Classification Search ................ 210/234, 210/235, 493.2, 450
See application file for complete search history.

(56) References Cited

U.S. PATENT DOCUMENTS

| | | | |
|---|---|---|---|
| 3,567,023 A | 3/1971 | Buckman et al. | |
| 3,726,403 A | 4/1973 | Shaltis | |
| 3,931,011 A | 1/1976 | Richards et al. | |
| 4,502,307 A | 3/1985 | Grunewald | |
| 4,581,135 A | 4/1986 | Gerulis | |
| 4,619,764 A | 10/1986 | Church et al. | |
| 4,836,923 A | 6/1989 | Popoff et al. | |
| 4,935,127 A | 6/1990 | Lowsky et al. | |
| 5,035,797 A | 7/1991 | Janik | |
| 5,049,269 A | 9/1991 | Shah | |
| 5,186,829 A | 2/1993 | Janik | |
| 5,486,288 A | 1/1996 | Stanford et al. | |
| 5,538,626 A | 7/1996 | Baumann | |
| 5,690,816 A | 11/1997 | Covington | |
| 5,753,107 A | 5/1998 | Magnusson et al. | |
| 5,766,463 A | 6/1998 | Janik et al. | |
| 5,770,054 A | 6/1998 | Ardes | |
| 5,826,854 A | 10/1998 | Janvrin et al. | |
| 5,837,137 A | 11/1998 | Janik | |
| 5,888,384 A | 3/1999 | Wiederhold et al. | |
| 5,922,199 A | 7/1999 | Hodgkins | |
| 6,006,924 A * | 12/1999 | Sandford | 210/440 |
| 6,096,199 A | 8/2000 | Covington | |
| 6,139,738 A | 10/2000 | Maxwell | |
| 6,146,527 A | 11/2000 | Oelschlaegel | |
| 6,174,438 B1 | 1/2001 | Hodgkins et al. | |

(Continued)

FOREIGN PATENT DOCUMENTS

DE     42 43 217     6/1994

(Continued)

*Primary Examiner*—Thomas M. Lithgow
(74) *Attorney, Agent, or Firm*—Reinhart Boerner Van Deuren P.C.

(57) ABSTRACT

A filter cartridge has a keyed end cap which is configured and shaped for unlocking an associated valve mechanism that comprises a latch device and a valve. In this manner, when the fuel filter cartridge is placed into a fuel filter housing having such a latch and valve mechanism, the fuel filter cartridge is operable therein to filter fluid and pass the fluid into a standpipe contained within the fuel filter housing. The fuel filter cartridge of this type generally includes pleated filter paper which is disposed between two opposed end caps. The keys may be provided along the bottom end cap.

20 Claims, 14 Drawing Sheets

U.S. PATENT DOCUMENTS

| | | |
|---|---|---|
| 6,189,513 B1 | 2/2001 | Brown et al. |
| 6,235,194 B1 | 5/2001 | Jousset |
| 6,248,236 B1 | 6/2001 | Hodgkins |
| 6,475,379 B2 | 11/2002 | Jousset et al. |
| 6,495,042 B1 | 12/2002 | Knight |
| 6,506,302 B2 | 1/2003 | Janik |
| 6,554,139 B1 | 4/2003 | Maxwell et al. |
| 6,555,000 B2 | 4/2003 | Knight |

FOREIGN PATENT DOCUMENTS

| | | | |
|---|---|---|---|
| EP | 0 880 987 A1 | | 12/1998 |
| WO | WO 95/13468 | | 5/1995 |
| WO | 2002-140525 | | 5/2000 |
| WO | 01/31329 | * | 6/2001 |
| WO | WO 02/078816 A1 | | 10/2002 |
| WO | WO 2006/112853 | | 10/2006 |

* cited by examiner

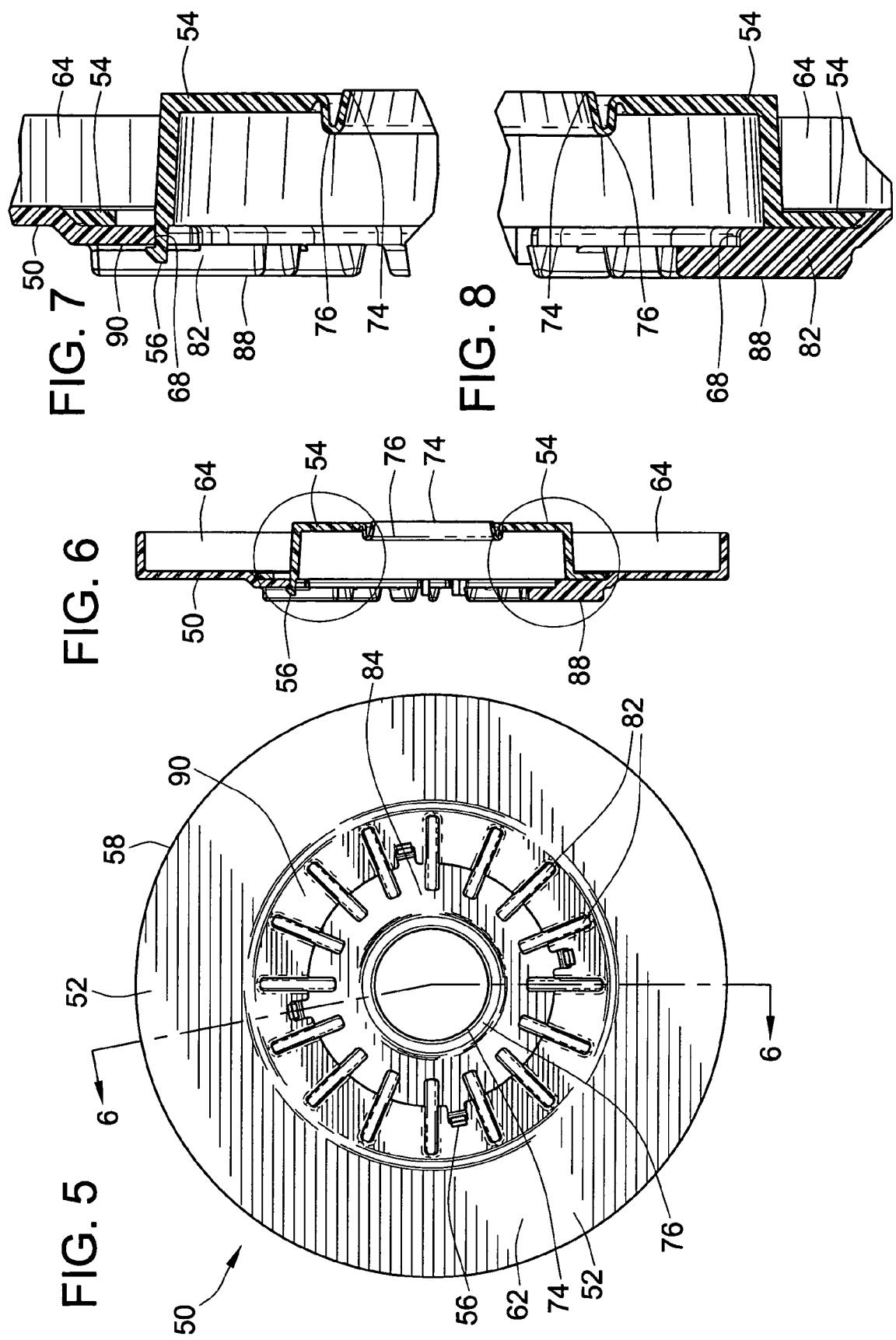

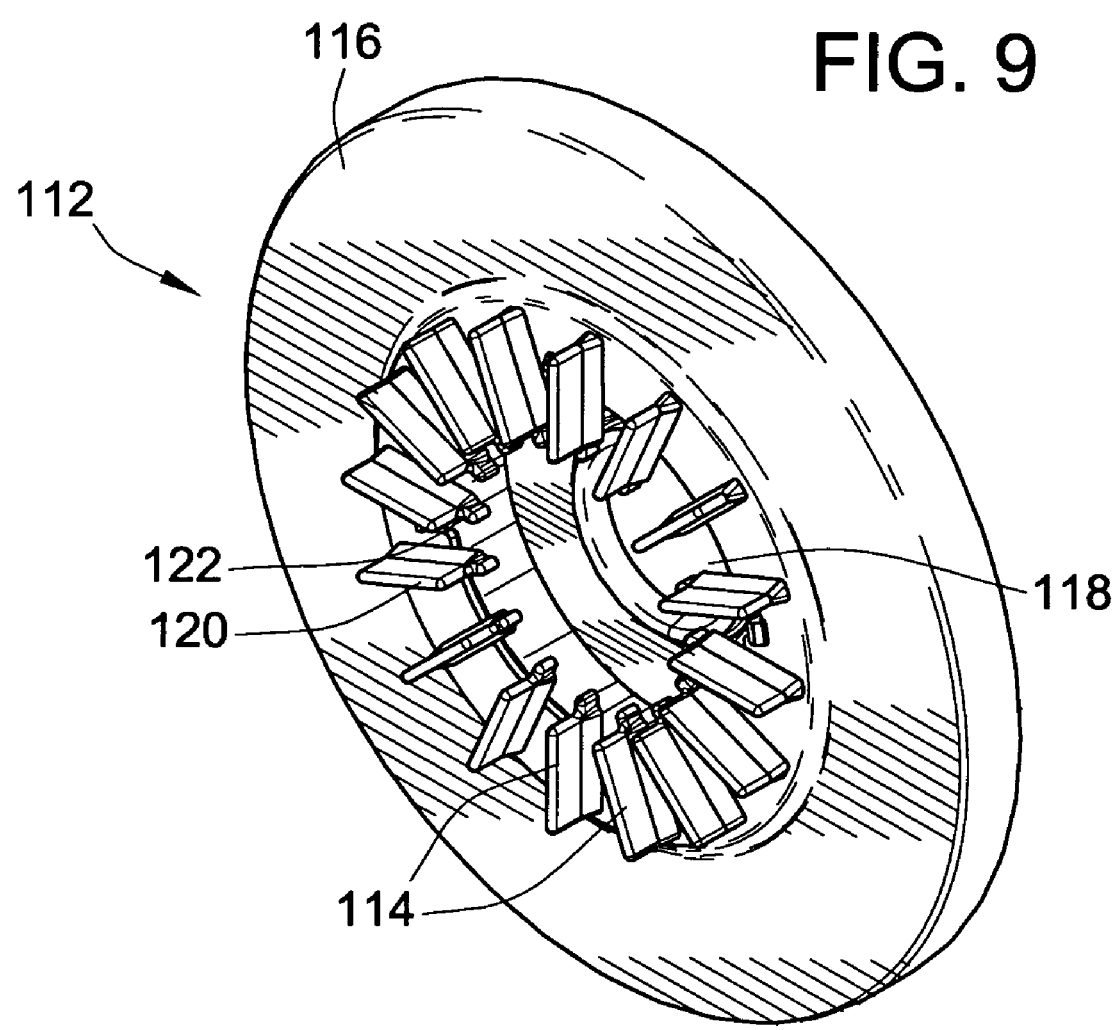

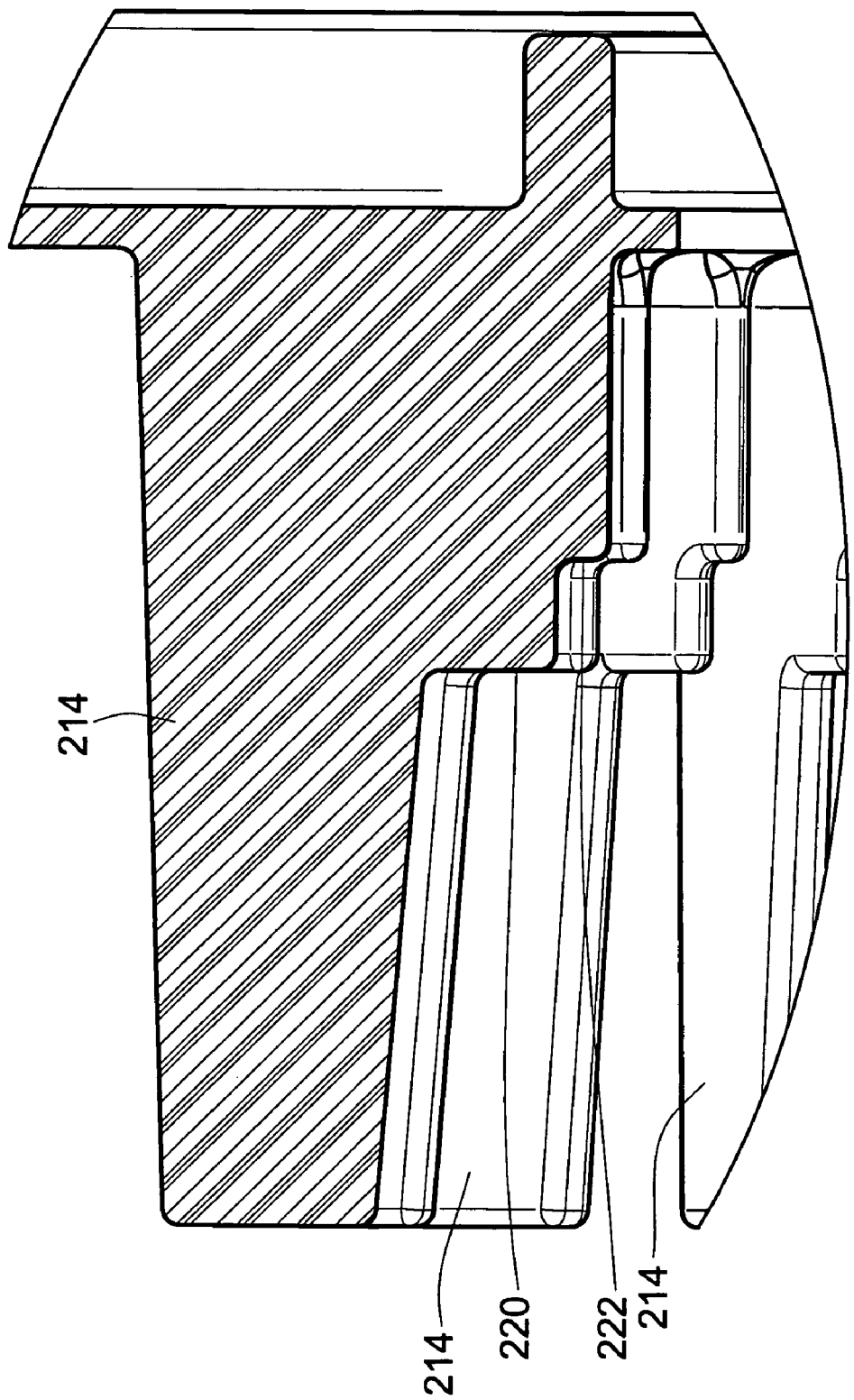

US 7,326,342 B2

FUEL FILTER CARTRIDGE AND KEYED END CAP

FIELD OF THE INVENTION

The present invention generally relates to filters and their components and more particularly relates to filter cartridges and end caps therefore which are configured to engage flow control valves in filter housings.

BACKGROUND OF THE INVENTION

The present invention relates to keyed fuel filter cartridges for a fuel filter housing which has a keyed latch shut-off valve as shown for example in U.S. Pat. Nos. 6,495,042 and 6,550,000, the entire disclosures of which are hereby incorporated by reference. As disclosed generally in these patents, stepped keys are provided in a recess formed in the bottom end cap of a fuel filter cartridge. Each of the stepped keys includes a valve actuation portion and a latch actuation portion, whereby the keys are used to unlock a latched device and move a valve element and uncover a fuel flow port in a standpipe of a valve housing. It is known that these fuel filter cartridges are periodically replaced from time to time, but the fuel filter housing is permanent and typically reused. In these applications the fuel filter cartridge is pulled from the fuel filter housing which returns the valve to the closed position and the latch mechanism to the lock position. As a result, when a new filter cartridge is installed there is a need to be able to again unlatch the latch device and then move the valve element to uncover the opening in the standpipe. The present invention relates to a fuel filter cartridge and end cap which may be used and applied to such fuel filter housings as disclosed in the '042 and '000 patents referenced above, or that may have other application.

BRIEF SUMMARY OF THE INVENTION

One aspect of the present invention is directed toward a fuel filter. The fuel filter includes a tube of filter media surrounding a longitudinal axis. A first end cap is placed on the first end of the tube of filtering media. The first end cap defines a first annular trough that is filled with potting compound to connect and seal the first end cap to the tube of filtering media. The first end cap defines a first central opening surrounding the longitudinal axis. A second end cap is located on the second end of the tube of filtering media. The second end cap includes an outer annular skirt portion, an inner annular skirt port and a disc portion therebetween. The second end cap defines a second annular trough along the disc portion between the skirt portions which has potting compound therein which connects and seals the first end cap to the tube of filtering media. The second end cap defines a second central opening which surrounds the longitudinal axis. Unlike the prior art, a plurality of keys are located on the disc portion and project axially from the disc portion in a direction away from the filtering media. The keys are arranged in an annular array surrounding the axis.

Another aspect of the present invention is directed toward an end cap for such a fuel filter cartridge. The end cap includes an outer annular skirt portion, an inner annular skirt portion and a disc portion therebetween. An annular trough is formed along the disc portion between the skirt portions on an underside of the end cap. A central opening is formed into the disc portion and surrounds the longitudinal axis. A plurality of keys are located on the disc portion and project axially from the disc portion. These keys are arranged in an annular array which surrounds the axis.

According to a different aspect and different embodiment of the present invention, a fuel filter comprises a tube of filtering media and first and second end caps placed upon opposing ends of the tube of filtering media. One of the end caps includes a cylindrical recess structure. Located in the recess structure is a first plurality of keys which project in the recess in an annular array and a second plurality of keys projecting in the recess in an annular array which are of a different characteristic than the first plurality of keys.

Other aspects, objectives and advantages of the invention will become more apparent from the following detailed description when taken in conjunction with the accompanying drawings.

BRIEF DESCRIPTION OF THE DRAWINGS

FIG. 5 is a bottom end view of the bottom end cap for the fuel filter of the first embodiment shown in FIG. 1.

FIG. 6 is a cross-section of FIG. 5 taken about line 6-6.

FIGS. 7 and 8 are enlarged views of different portions of FIG. 6.

FIG. 9 is a view of a bottom end cap of a second embodiment of the present invention for a fuel filter cartridge.

FIG. 19 is an enlarged view of a portion of FIG. 18.

FIGS. 20 and 21 are isometric views of a bottom end cap for use in a fuel filter cartridge according to a fourth embodiment in which FIGS. 20 and 21 show different perspectives of the bottom end cap.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
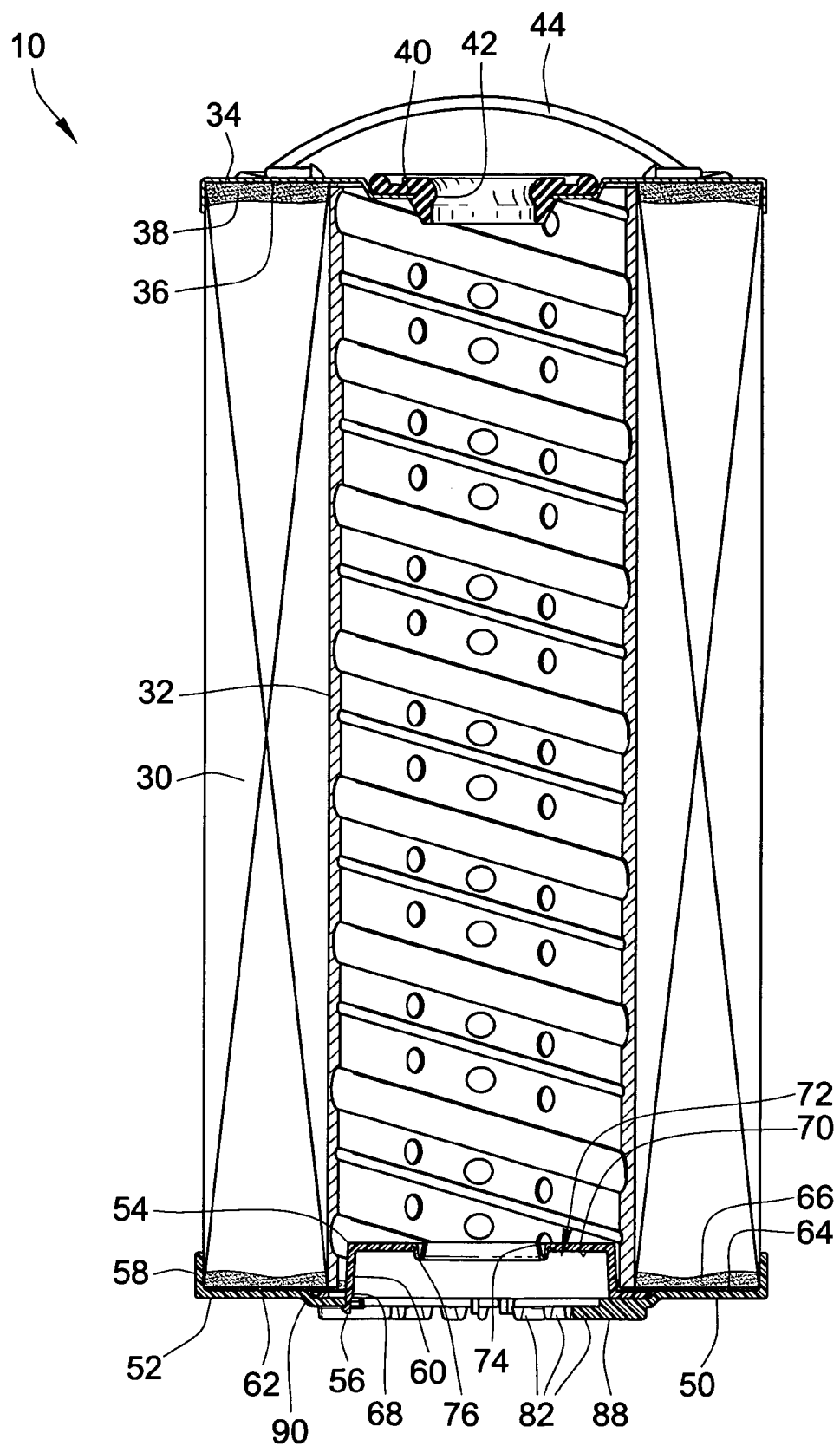
FIG. 1 is a cross-section of a fuel filter cartridge in accordance with a first embodiment of the present invention.
Figure 2:
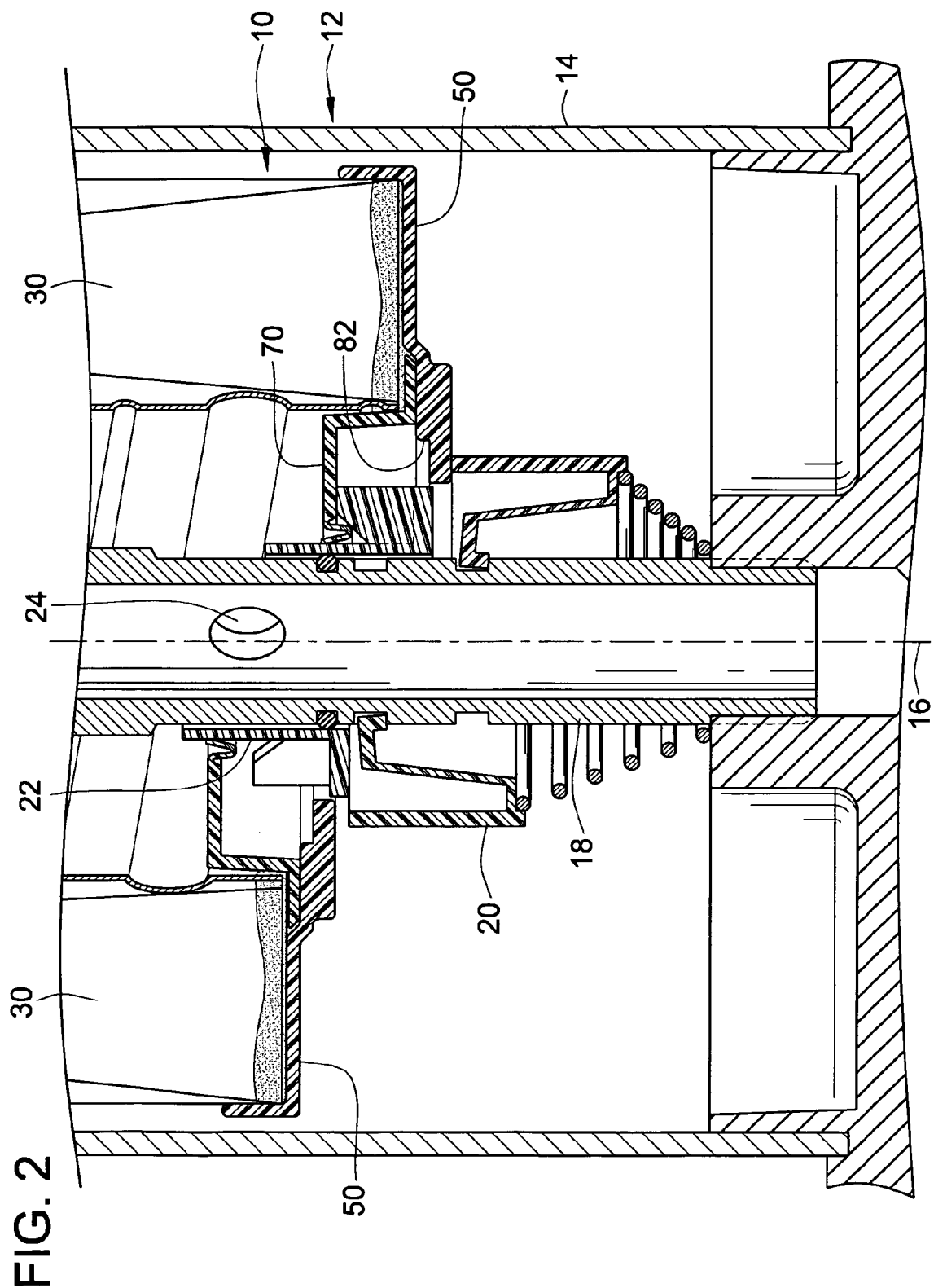
FIG. 2 is a cross-section of the bottom end cap portion of the fuel filter cartridge shown in FIG. 1 as installed on a standpipe in a fuel filter housing and engaging a latch and valve mechanism therein.
Figure 3:
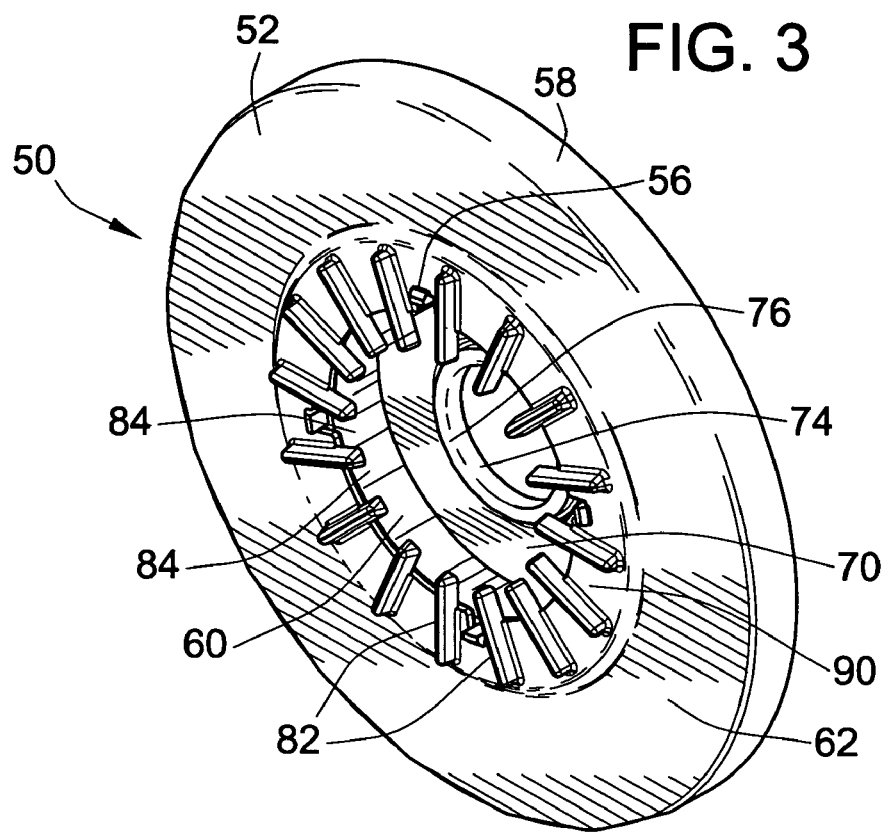
FIG. 3 is an isometric view of the bottom end cap of the fuel filter cartridge of FIG. 1.
Figure 4:
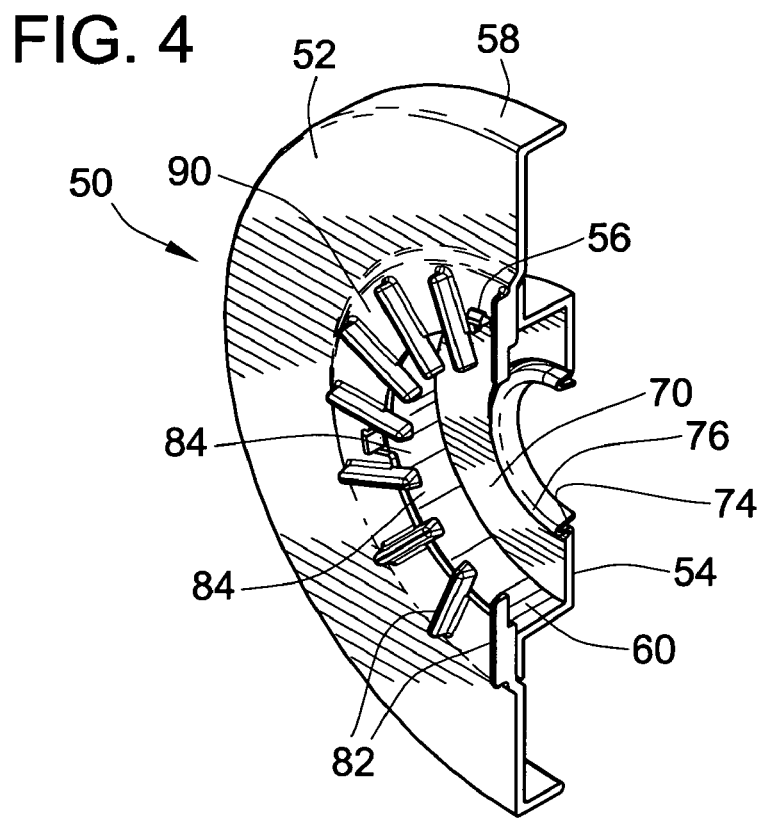
FIG. 4 is a view similar to FIG. 3, but with the end cap cut in half.
Figure 10:
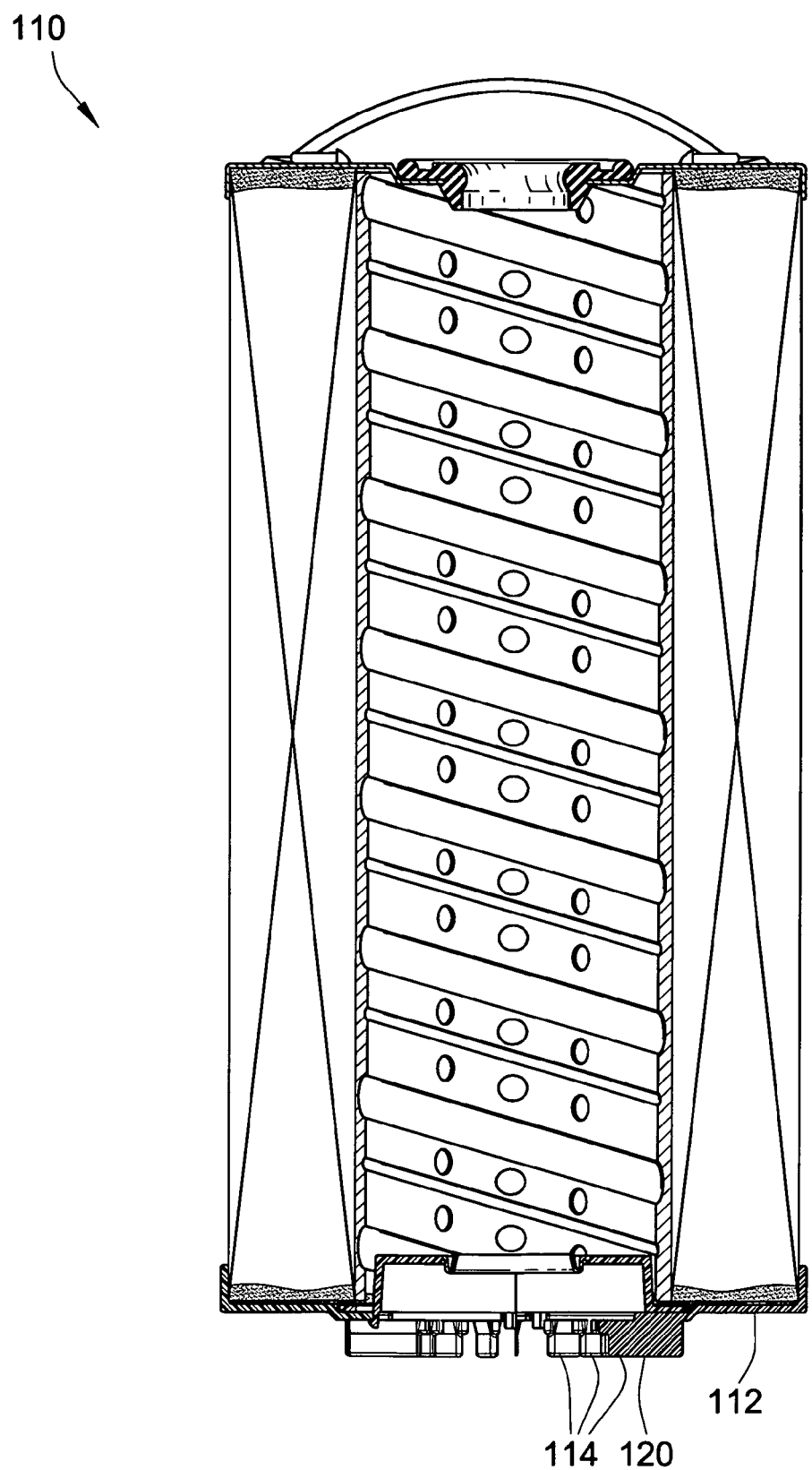
FIG. 10 is a view of the end cap of the second embodiment as mounted on a filter cartridge.
Figure 13:
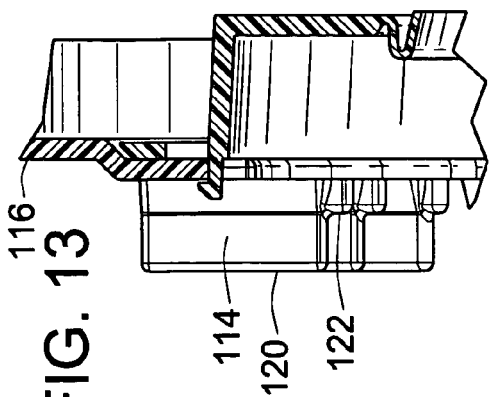
FIGS. 13 and 14 are enlarged views of different portions of FIG. 12.
Figure 14:
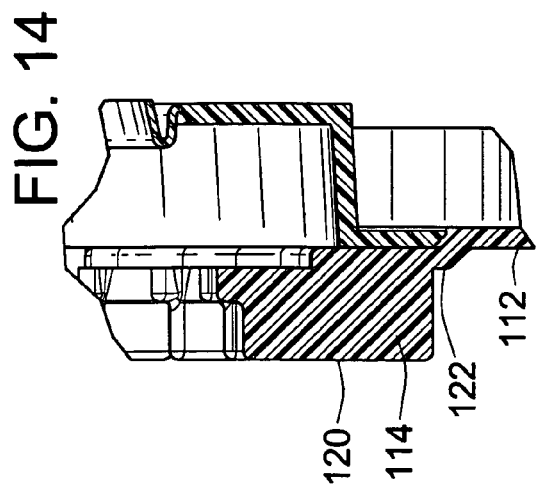
Figure 12:
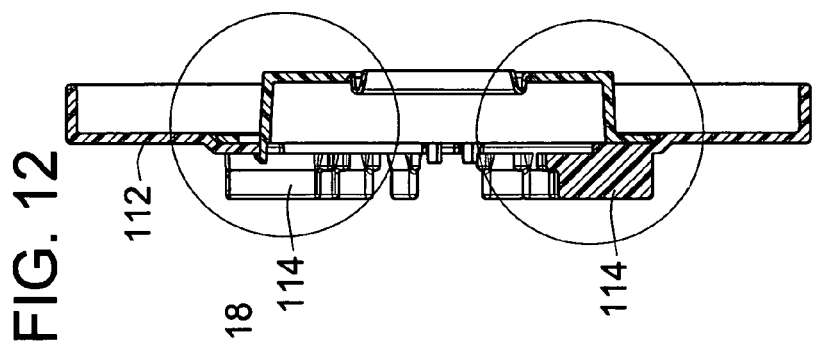
FIG. 12 is a cross-section of FIG. 11 taken about line 12-12.
Figure 11:
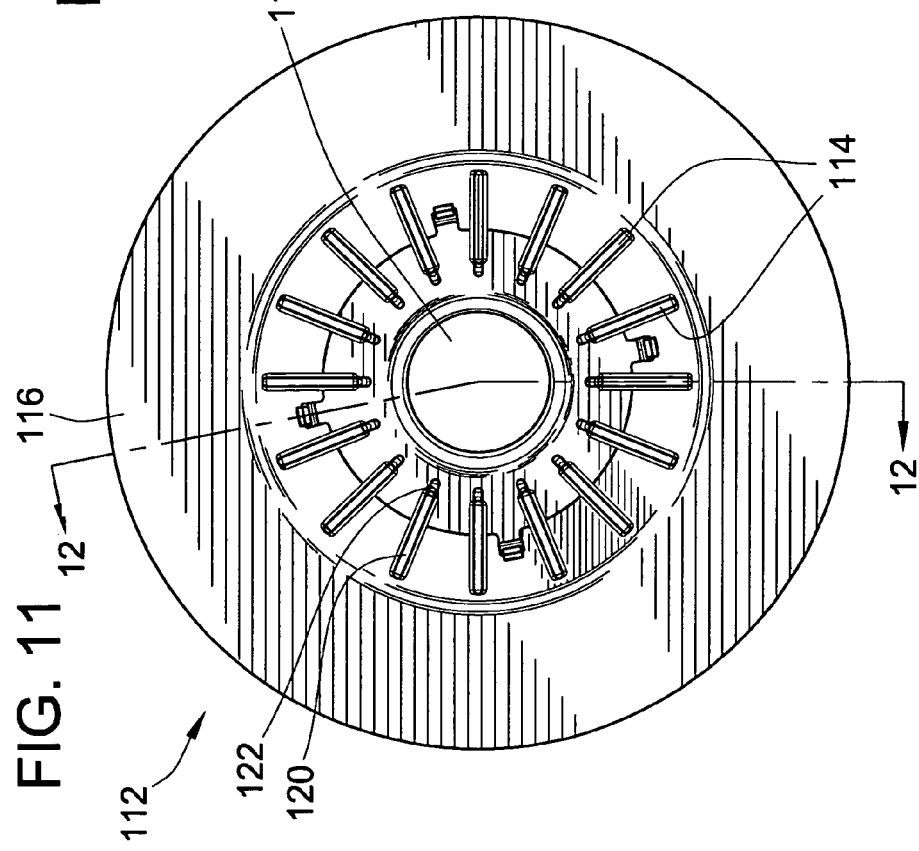
FIG. 11 is a plan bottom view of the second embodiment of the end cap shown in FIG. 9.
Figure 15:
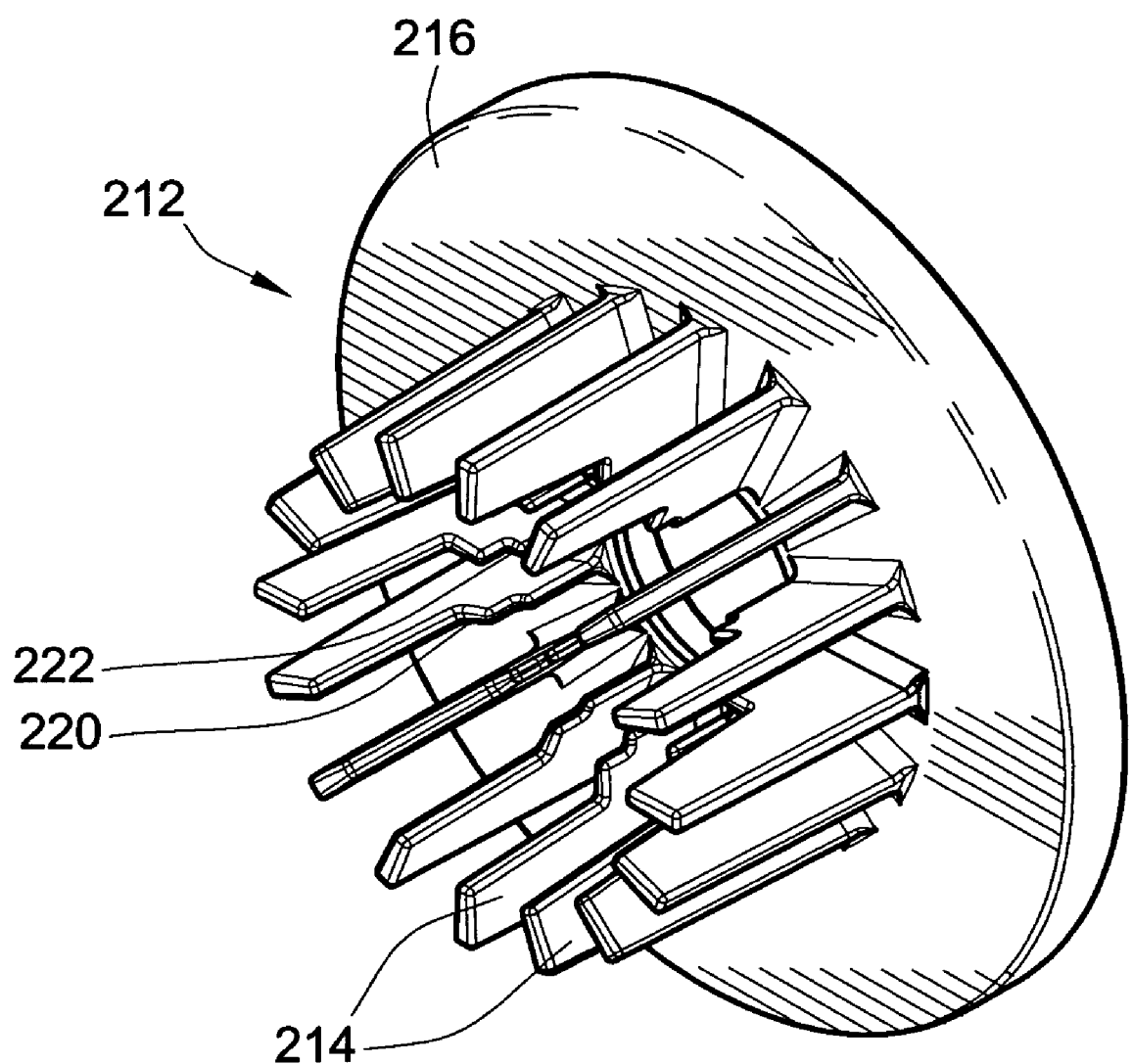
FIG. 15 is an isometric view of a third embodiment of the end cap which may be used on a filter cartridge.
Figure 16:
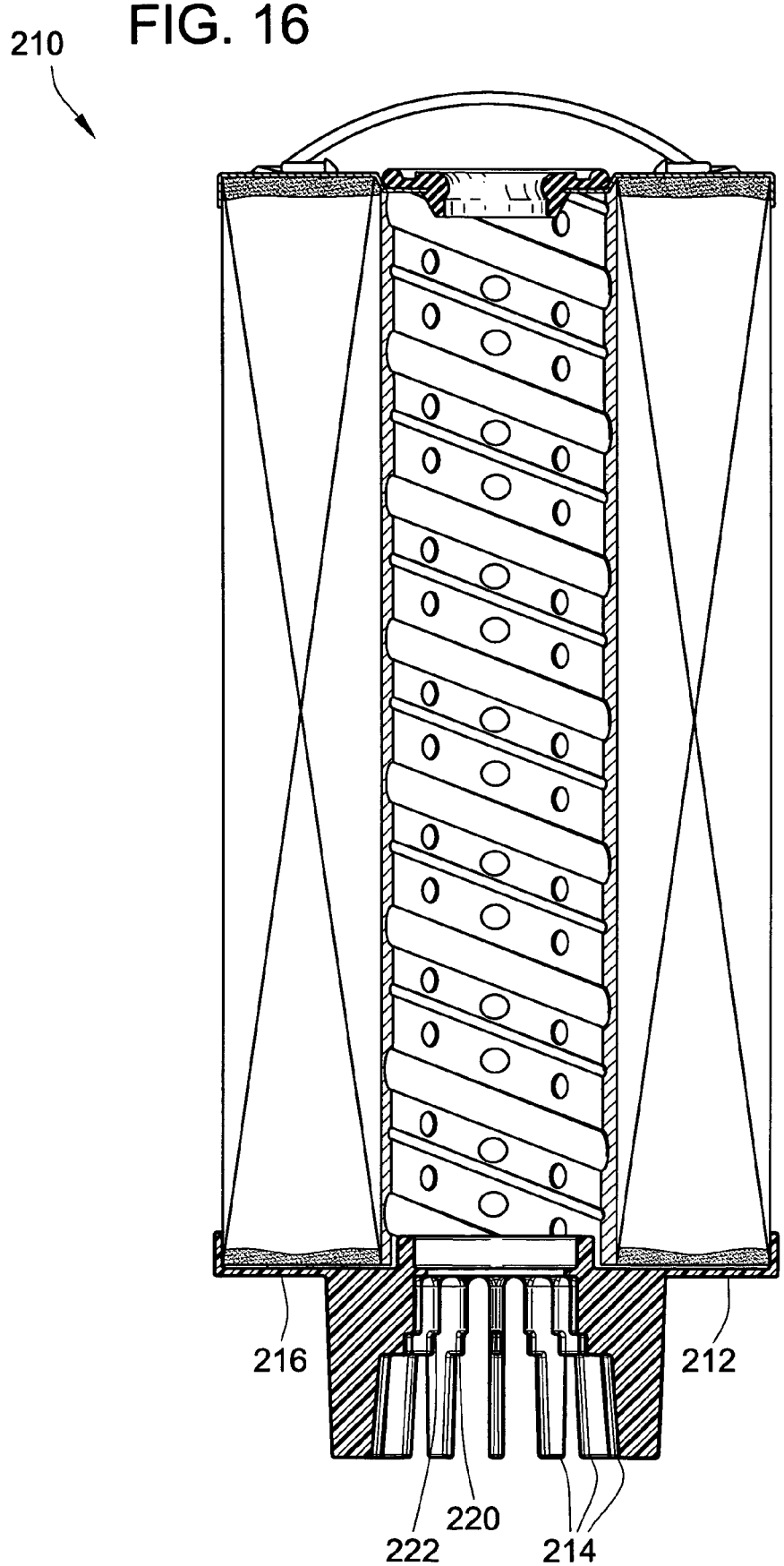
FIG. 16 is a view of the third embodiment of the end cap shown in FIG. 15 as mounted on a fuel filter cartridge.
Figure 18:
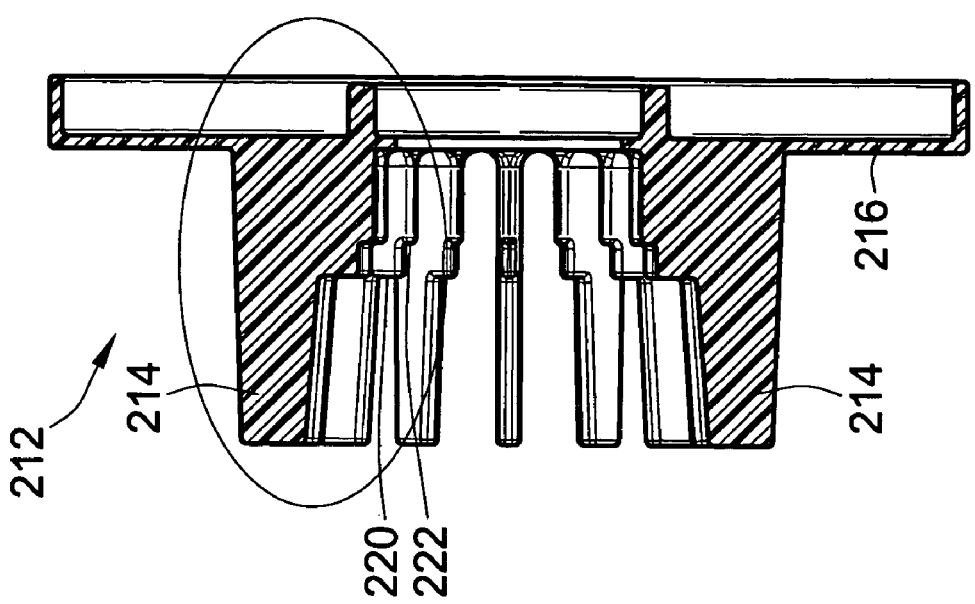
FIG. 18 is a cross-section of the end cap shown in FIG. 17.
Figure 17:
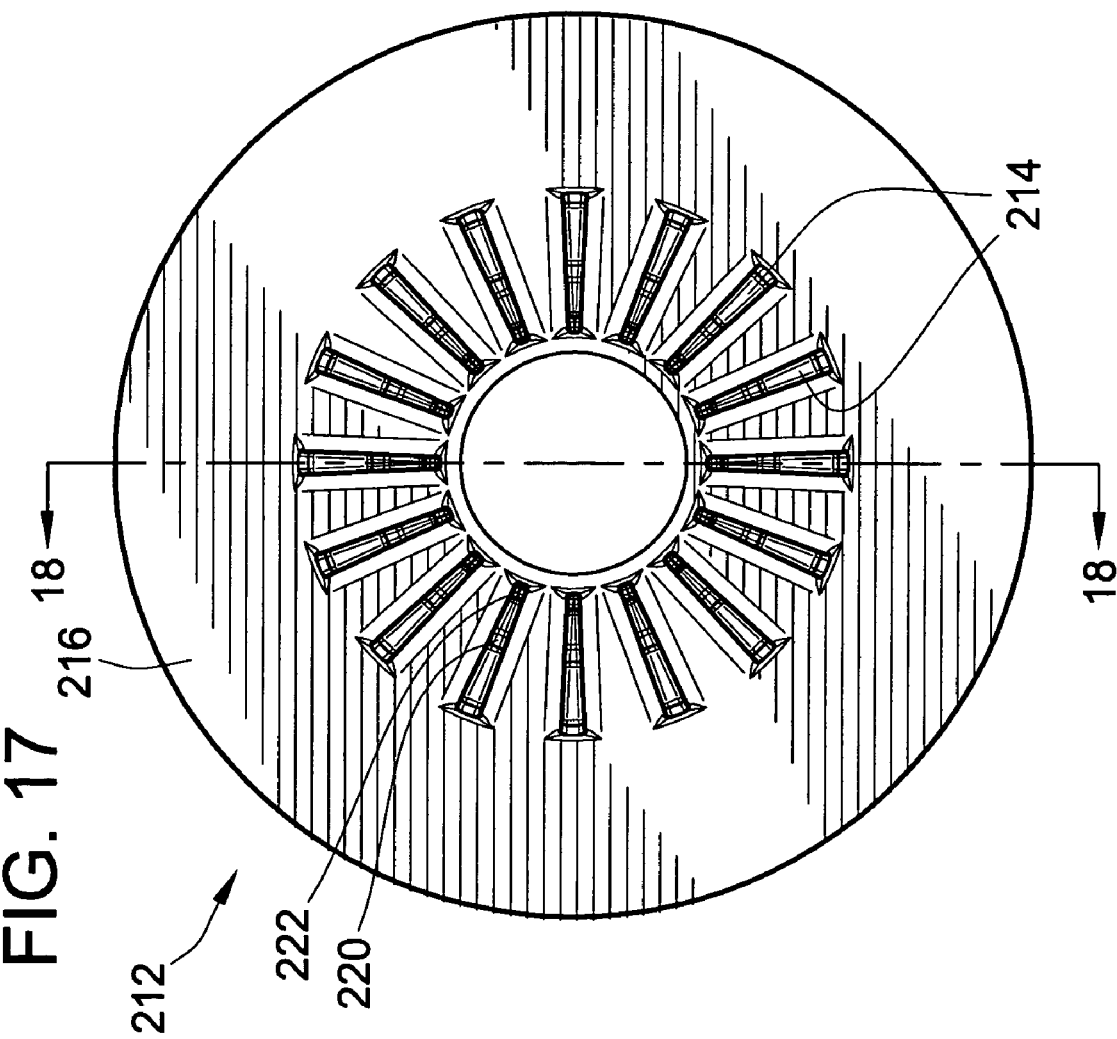
FIG. 17 is a bottom plan view of the end cap according to the third embodiment shown in FIG. 15.
Figure 20:
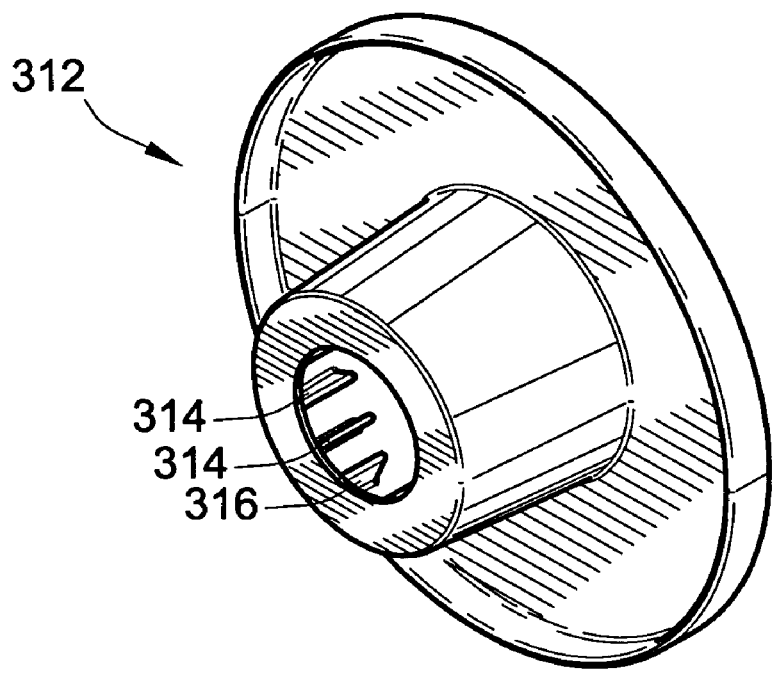
Figure 21:
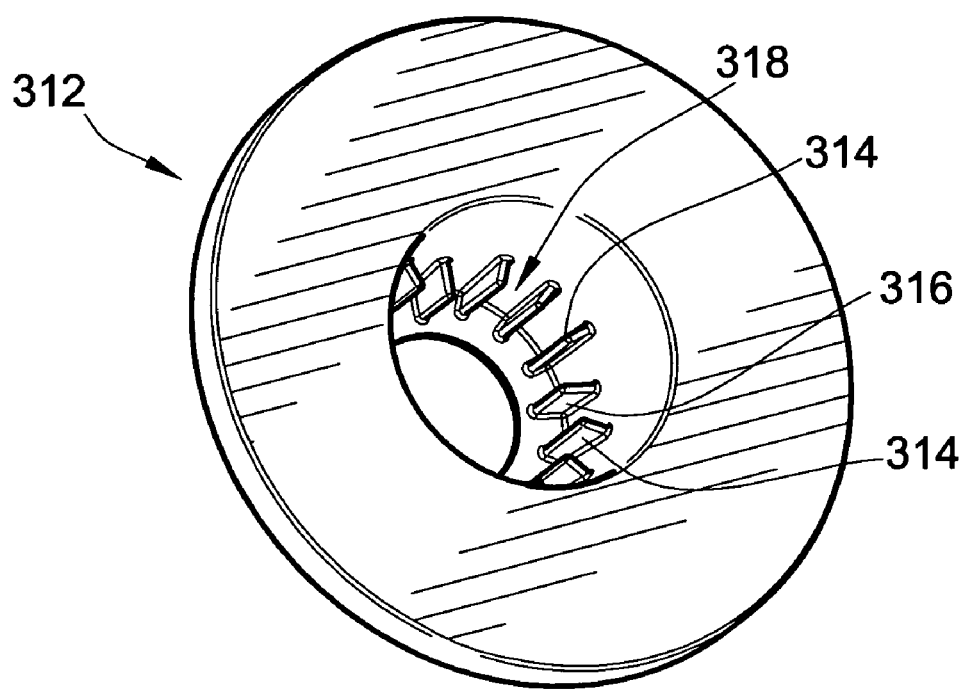
Figure 24:
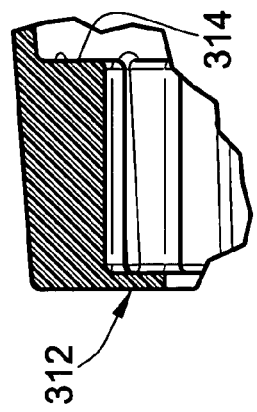
FIGS. 24 and 25 are enlarged portions of different segments of the cross-section shown in FIG. 23.
Figure 25:
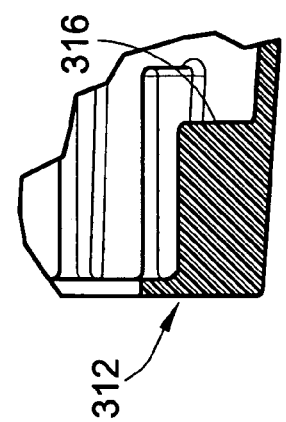
Figure 23:
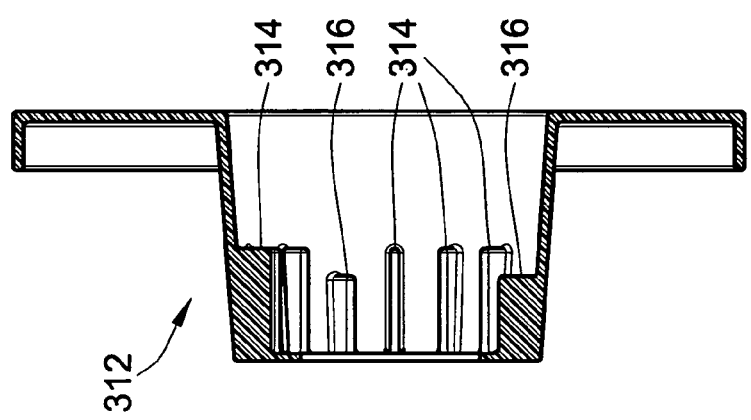
FIG. 23 is a cross-section of the end cap shown in FIG. 22.
Figure 22:
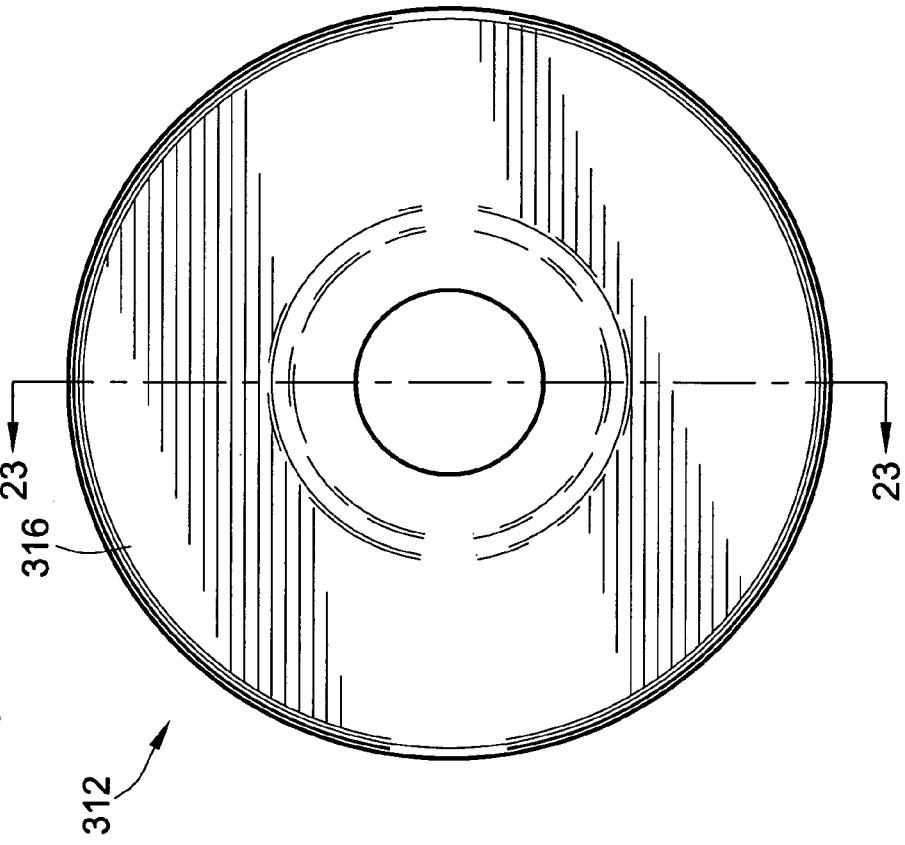
FIG. 22 is a plan view of an inward side of the bottom end cap of the fourth embodiment shown in FIGS. 20 and 21.
Figure 26:
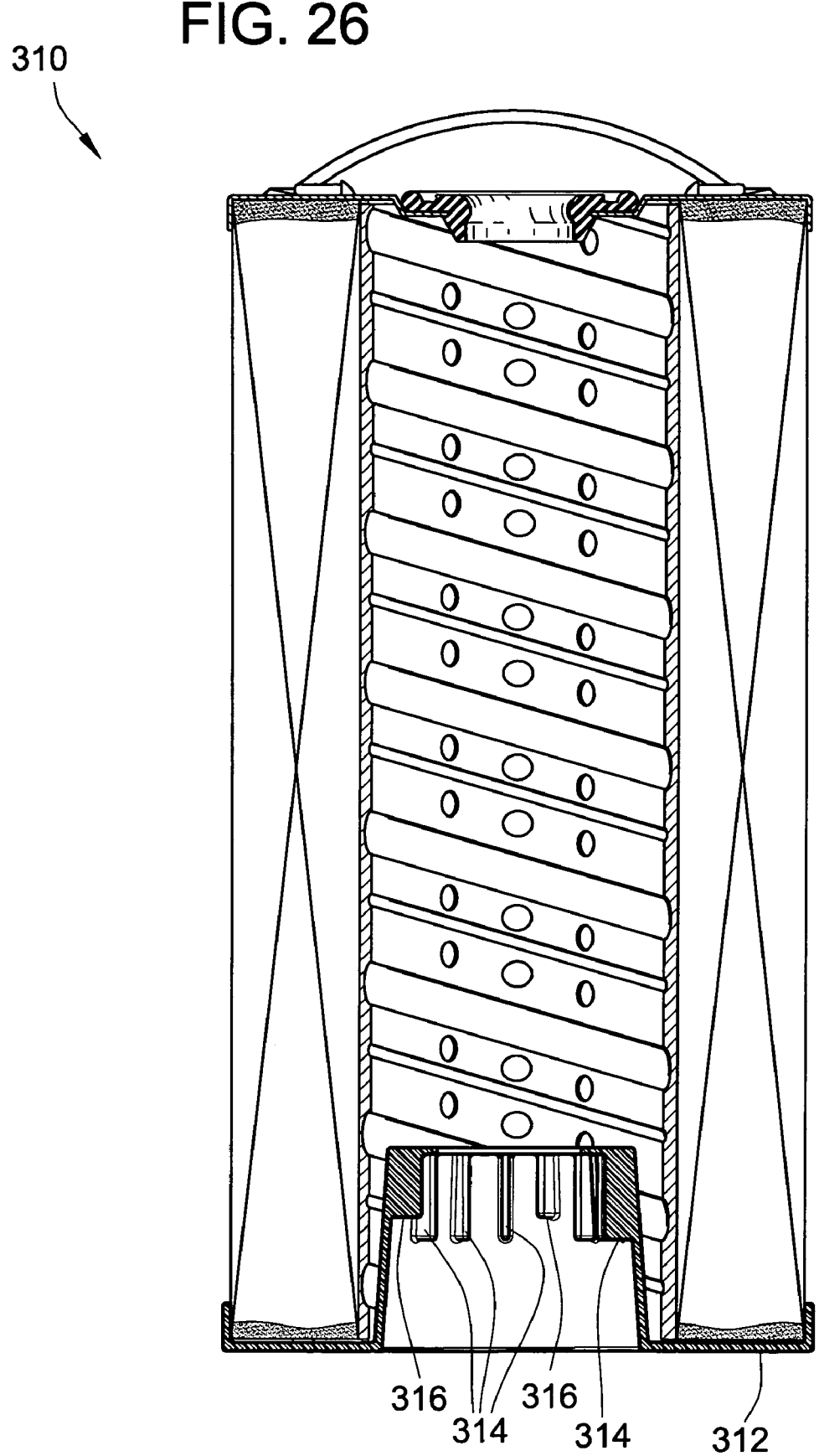
FIG. 26 is a view of the end cap of the fourth embodiment as mounted on a filter cartridge.

Referring to the first embodiment of FIGS. 1-8, the invention is embodied in a fuel filter cartridge 10 as shown in FIG. 1 which is removably installed into a fuel filter housing 12, the relevant portions of which are shown in FIG. 2. This housing 12 depicts an exemplary environment in which the fuel filter cartridge 10 will operate. As shown therein, the fuel filter housing includes a container 14 into which the fuel filter cartridge 10 is axially inserted along a longitudinal axis 16 (longitudinal axis 16 also designates the central axis for the fuel filter cartridge 10). Concentric and co-axial with the longitudinal axis is a fuel standpipe 18 which carries a spring loaded latch device 20 in the form of a sleeve and a flow control valve 22 which opens and closes a fuel flow port 24 that extends radially through the standpipe 18. As shown in FIG. 2, different halves of the longitudinal axis 16 depict different engagement positions at different stages of axial insertion of the fuel filter cartridge 10 into the fuel filter housing 12. As shown therein, the fuel filter cartridge 10 will first engage the latch device 20 and then subsequently engage the valve 22 to uncover the flow port to allow for fuel flow from the central region of the fuel filter cartridge 10 into the standpipe 18. Further details of such a fuel filter housing and standpipe can be had to the referenced patents set forth in the background above.

With an exemplary operating environment for the present embodiment being understood, attention will now be directed toward the fuel filter cartridge 10. The fuel filter cartridge 10 generally includes a cylindrical tube of filtering media 30 that is concentric around the longitudinal axis 16. The tube of filtering media 30 may comprise a cylindrical ring of pleated filter paper, or may comprise other suitable filtering media. A perforated metal or plastic central support tube 32 may be provided concentrically inside the filtering media 30 to provide for radial support to the filtering media 30. The support tube 32 provides support for the media 30 when fuel is flowing radially inward through the filtering media 30.

At the top end of the filter cartridge 10 with the given orientation shown in FIG. 1, there is a top end cap 34. The top end cap 34 defines an annular trough 36 along the underside thereof. The annular trough 36 that receives potting compound 38 (such as plastisol, adhesive or other suitable bonding agent) which connects and seals the top end cap 34 to the top end of the filtering media 30. The top end cap 34 defines a central opening 40 which is sized to receive the standpipe 18 therethrough. Along the inner lip of the central opening 40 the top end cap 34 carries an annular gasket 42 which engages and seals against the standpipe 18 shown in FIG. 2 when installed into the fuel filter housing 12. A collapsible handle 44 may also be mounted to the top end cap 34 to provide a means for ready removal of the fuel filter cartridge at filter change interval time. The handle 44 can be pulled to facilitate removal of the fuel filter cartridge.

Turning to the bottom side of the filter cartridge 10, a bottom end cap 50 is provided. The bottom end cap 50 may be comprised of two separate component plastic parts including a generally plate-shaped member 52 and a generally ring-shaped member 54 which are assembled together as shown. One method for assembling the two members 52 and 54 together is a snap-lock connection in which snap tabs 56 projecting from one of the members 54 is snapped onto corresponding structure on the other member 52 to form the bottom end cap 50.

The bottom end cap 50 once assembled includes an outer annular skirt 58, an inner skirt 60 and a generally planar disc portion 62 therebetween. The combination of these structural portions provides an annular trough 64 which is received onto the bottom end of the filtering media 30 and connected and sealed thereto by potting compound 66. The inner periphery of the disc portion 62 defines a central opening 68 which may be recessed into the filtering media 30 as indicted via the inner skirt 60. The inner skirt 60 extends axially inward and terminates in a radially inward extending bottom wall 70 to form a generally cylindrical recess 72. The bottom wall 70 is generally planar in nature and extends radially inward toward a further central opening 74 that is of a smaller diameter than the outer central opening 68. The bottom wall 70 in this embodiment is used as the valve actuation means as shown in FIG. 2. Surrounding the central opening 74 is a loop structure or lip 76 which is configured to slidably engage the standpipe and provides for some flexibility to allow for easier axial installation and location features. The lip 76 which extends axially also flexes slightly inwardly and outwardly radially relative to the standpipe.

Since the valve 22 cannot be actuated without first removing the protective latch device 20 as shown in FIG. 2, the bottom end cap 50 also provides means for engaging the latch device which is shown in the form of an annular array of keys 82. The keys 82 are not located in the recess 72 but are located on the disc portion 62 and project axially from the disc portion 62 in an outward direction, which is away from the filtering media 30. The keys 82 are arranged in an annular array which surrounds the central longitudinal axis 16.

As shown in the figures, the keys 82 project radially inward past the outer central opening 68 in a cantilever manner such that gaps 84 are formed between adjacent keys to provide suitable clearance for use with the associated standpipe and valve/latch mechanism. The keys are arranged and spaced to provide means for releasing the latch device 20 of the flow control valve 22 in the filter housing. The keys 82 are configured and spaced relative to the valve actuating bottom wall 70 so as to compliment the configuration of the latch device 20 and valve 22 of the fuel filter housing. To achieve this, the keys 82 only extend partially radially inward and short of the diameter of the inner central opening 74. With this configuration, there is no longer a requirement that the outer face of the keys be stepped. Instead as shown the keys 82 may have an outer surface 88 which is relatively straight in the radial direction. The keys 82 may also be elevated slightly by a raised annular plateau portion 90 which is formed into the disc portion 62 of the plate-shaped member 52. This raised plateau portion 90 also provides along the inward side a recess area to receive a radial projection of the ring-shaped member 54 and thereby provide a flat underside surface for the annular trough 64 to better ensure connection and sealing between the bottom end cap 50 and the filtering media 30 via the potting compound 66.

Turning to the second embodiment of the present invention shown in FIGS. 9-14, a disposable fuel filter cartridge 110 is illustrated which will be understood to be similar in most material respects to FIG. 1, with the primary exception being the configuration and keying mechanism of the bottom end cap 112. Accordingly, focus as applied to this embodiment will be directed to the principle distinctions. In this embodiment, the bottom end cap 112 still includes keys 114 which project from the disc portion 116 of the bottom end cap 112. Similar to the first embodiment, the keys 114 avoid and are clear of the recess structure 118 formed into the bottom end cap 112. However, as opposed to the first embodiment where the bottom wall of the recess provides the valve actuation means, in this embodiment the keys 114 themselves provide for both the latch actuation means and the valve actuation means. In particular, the keys 114 are stepped to include a first latch actuation surface 120 and a second valve actuation surface 122. These surfaces 120, 122 are both axially and radially spaced with a configuration and spacing that is complimentary to that of the latch device and valve of a corresponding fuel filter housing.

Turning to a third embodiment of the present invention, with reference to FIGS. 15-19, it will be understood that the fuel filter cartridge 210 of the third embodiment is much like the earlier two embodiments with a principle distinction being the configuration and shape of the bottom end cap 212. In this embodiment, the bottom end cap 212 may be formed of a single unitary member rather than two component part members which are assembled together. Further, this embodiment eliminates the recess structure of prior embodiments and instead the keys 214 are formed on the outer face or disc portion 216 of the bottom end cap projecting axially outward therefrom (in a direction away from the filtering media). Similar to the second embodiment, these keys 214 also include a stepped surface to include a latch actuation surface 120 and a valve actuation surface 122 which are both radially and axially spaced relative to each other. A potential advantage of an embodiment like this is that the inner diameter of the filtering media may be moved inwardly if desired (e.g. the inner diameter of the filtering media may be smaller).

A fourth embodiment of a fuel filter cartridge 310 is shown in FIGS. 20-26, which will be understood to be in many respects similar to the earlier embodiments of fuel filter cartridges again with the principle exception being the configuration and operation of the bottom end cap 312. This embodiment has significant distinctions as opposed to the earlier embodiments in that at least two different type of keys 314, 316 are provided. Also opposed to earlier embodiments, the keys 314 and 316 are not disposed on the end face of the bottom end cap 312, but instead located and supported in the cylindrical recess 318 of the bottom end cap 312. However, rather than providing for a complex stepped surface on each of the keys, this embodiment uses two different types of keys 314, 316 of a different characteristic. In particular, the first set of keys 314 are axially longer and radially skinnier that the second set of keys 316. In this manner, one set of the keys 314 are used to engage and unlock the latch device while the other set of keys 316 are used to actuate the valve and thereby open the flow port. The two sets of keys 314 and 316 are arranged in a common circular array. Also, the keys 314, 316 of this embodiment are not cantilevered with the support only along one side, but instead supported along two different sides of each of the keys including a first side connected to the inner annular skirt and a second side connected to the bottom wall.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel filter, comprising:
   a tube of filtering media surrounding a longitudinal axis;
   a first end cap defining a first annular trough receiving a first end of the tube of filtering media, the first end cap being connected and sealed to the tube of filtering media, the first end cap defining a first central opening surrounding the longitudinal axis;
   a second end cap including an outer annular skirt portion, an inner annular skirt portion, and disc portion therebetween, the second end cap defining a second annular trough along the disc portion therebetween the skirt portions, the second annular trough receiving a second end of the tube of filtering media, the second end cap being connected and sealed to the tube of filtering media, the second end cap defining a second central opening surrounding the longitudinal axis;
   a plurality of keys located on the disc portion and projecting axially from the disc portion in a direction away from the filtering media, the keys being arranged in an annular array surrounding the axis; and
   wherein the second end cap further includes a cylindrical recess having a bottom wall, the bottom wall projecting radially inward from the inner skirt portion and defining a third central opening surrounding the axis of a smaller diameter than the second central opening.

2. The fuel filter of claim 1, wherein the keys project radially inward over the second end cap opening, wherein gaps are formed between adjacent keys.

3. The fuel filter of claim 1, wherein the keys have an outer portion that is axially aligned with the filtering media.

4. The fuel filter of claim 1, wherein the keys are arranged and spaced to provide means for releasing a latch of a valve in a fuel filter housing, and wherein the bottom wall is arranged relative to the keys to providing means for actuating the valve.

5. The fuel filter of claim 4, wherein the keys are axially spaced from the recess.

6. The fuel filter of claim 1, wherein the keys are axially spaced from the filtering media.

7. The fuel filter of claim 1, wherein the disc portion includes a raised annular plateau portion projecting axially away from the filtering media, the keys being arranged on the raised annular plateau.

8. A fuel filter, comprising:
a tube of filtering media surrounding a longitudinal axis;
a first end cap defining a first annular trough receiving a first end of the tube of filtering media, the first end cap being connected and sealed to the tube of filtering media, the first end cap defining a first central opening surrounding the longitudinal axis;
a second end cap including an outer annular skirt portion, an inner annular skirt portion, and disc portion therebetween, the second end cap defining a second annular trough along the disc portion therebetween the skirt portions, the second annular trough receiving a second end of the tube of filtering media, the second end cap being connected and sealed to the tube of filtering media, the second end cap defining a second central opening surrounding the longitudinal axis;
a plurality of keys located on the disc portion and projecting axially from the disc portion in a direction away from the filtering media, the keys being arranged in an annular array surrounding the axis; and
wherein the second end cap comprises different first and second component parts that are assembled together, the first component part providing the outer annular skirt portion and the disc portion, the second component part providing the inner annular skirt portion and defining providing a bottom wall projecting radially inward from the inner annular skirt portion, the bottom wall being spaced axially from the disc portion whereby a cylindrical recess is formed into the second end cap, the bottom wall portion defining a third central opening surrounding the axis of a smaller diameter than the second central opening.

9. The fuel filter of claim 8, wherein the first component part is snap locked to the second component part.

10. The fuel filter of claim 1, wherein the keys include a stepped surface to provide first means for releasing a latch of a valve in a fuel filter housing and second means for actuating the valve.

11. The fuel filter of claim 1, wherein only a single side of the keys are supported by the second end cap, such that the keys are supported in a cantilever manner.

12. An end cap for a filter, comprising:
an outer annular skirt portion;
an inner annular skirt portion;
a disc portion between the skirt portions;
an annular trough along the disc portion therebetween the skirt portions;
a central opening in the disc portion surrounding the longitudinal axis;
a plurality of keys located on the disc portion and projecting axially from the disc portion, the keys being arranged in an annular array surrounding the axis; and
wherein the keys project radially inward over the central opening, wherein gaps are formed between adjacent keys.

13. The end cap of claim 12, further comprising a cylindrical recess having a bottom wall, the bottom wall projecting radially inward from the inner skirt portion and defining a central hole surrounding the axis of a smaller diameter than the second central opening.

14. The end cap of claim 13, wherein the keys are arranged and spaced to provide means for releasing a latch of a valve in a fuel filter housing, and wherein the bottom wall is arranged relative to the keys to providing means for actuating the valve.

15. The end cap of claim 14, wherein the keys are axially spaced from the recess.

16. The end cap of claim 12, wherein the disc portion includes a raised annular plateau portion projecting axially, the keys being arranged on the raised annular plateau.

17. An end cap for a filter, comprising:
an outer annular skirt portion;
an inner annular skirt portion;
a disc portion between the skirt portions;
an annular trough along the disc portion therebetween the skirt portions;
a central opening in the disc portion surrounding the longitudinal axis;
a plurality of keys located on the disc portion and projecting axially from the disc portion, the keys being arranged in an annular array surrounding the axis; and
wherein the second end cap comprises different first and second component parts assembled together, the first component part providing the outer annular skirt portion and the disc portion, the second component part providing the inner annular skirt portion and defining providing a bottom wall projecting radially inward from the inner annular skirt portion, the bottom wall being spaced axially from the disc portion whereby a cylindrical recess is formed into the second end cap, the bottom wall portion defining a third central opening surrounding the axis of a smaller diameter than the second central opening.

18. The end cap of claim 17, wherein the first component part is snap locked to the second component part.

19. The end cap of claim 12, wherein the keys include configured stepped surface to provide first means for releasing a latch of a valve in a fuel filter housing and second means for actuating the valve.

20. The end cap of claim 12, wherein only a single side of the keys are supported by the second end cap, such that the keys are supported in a cantilever manner.

* * * * *